United States Patent [19]

Kätscher et al.

[11] 4,336,103

[45] Jun. 22, 1982

[54] METHOD OF REPAIRING PARTLY BURNT-OFF FUEL ELEMENTS IN THE FUEL-ELEMENT PIT PRESSURIZED WATER REACTORS AND DEVICE THEREFOR

[75] Inventors: Erich Kätscher, Marloffstein; Klaus Knecht; Heinz Knaab, both of Erlangen, all of Fed. Rep. of Germany

[73] Assignee: Kraftwerk Union Aktiengesellschaft AG, Mulheim, Fed. Rep. of Germany

[21] Appl. No.: 121,504

[22] Filed: Feb. 14, 1980

Related U.S. Application Data

[63] Continuation of Ser. No. 822,676, Aug. 8, 1977, abandoned.

[30] Foreign Application Priority Data

Aug. 6, 1976 [DE] Fed. Rep. of Germany ....... 2635501

[51] Int. Cl.³ .............................................. G21C 17/00
[52] U.S. Cl. ..................................... 376/245; 376/251
[58] Field of Search .......................... 176/19 LD, 30

[56] References Cited

U.S. PATENT DOCUMENTS 3,575,802  4/1971  Gelius ............................. 176/19 LD
3,990,591  11/1976  Street et al. ............................ 176/30
4,034,599  7/1977  Osborne ......................... 176/19 LD

FOREIGN PATENT DOCUMENTS 1564301  12/1966  Fed. Rep. of Germany.
2127066  6/1971  Fed. Rep. of Germany.
2314650  3/1973  Fed. Rep. of Germany.
2424431  5/1974  Fed. Rep. of Germany.
54-138990  10/1979  Japan ..................................... 176/30

Primary Examiner—Sal Cangialosi
Attorney, Agent, or Firm—Herbert L. Lerner

[57] ABSTRACT

A method of repairing partly burnt-off fuel elements in a fuel-element pit of a pressurized-water reactor which includes placing a fuel element previously detected as being defective into a holding cage in substantially upright position with the aid of remotely controlled tools, and tipping it over through 180°; removing the then upwardly disposed fuel-element foot from the fuel element so as to expose the ends of the fuel rods received in the fuel element; inspecting the fuel rods, the ends of which are then freely accessible for defects; removing with a fuel-rod exchanging tool those fuel rods at least which are determined to be defective and depositing them in a storage container; and raising replacement rods with the fuel-rod exchanging tool and inserting them into the fuel element without bending stress in exchange for the removed fuel rods.

5 Claims, 6 Drawing Figures

METHOD OF REPAIRING PARTLY BURNT-OFF FUEL ELEMENTS IN THE FUEL-ELEMENT PIT PRESSURIZED WATER REACTORS AND DEVICE THEREFOR

This is a continuation of Ser. No. 822,676, filed Aug. 8, 1977, now abandoned.

The invention relates to a method for repairing partly burnt-off fuel elements or assemblies in fuel-element pits of pressurized-water reactors and a device for removing fuel rods in the performance of the method.

Irradiated fuel elements which contain defective fuel rods and have not yet attained the planned burn-off thereof can be refitted for further insertion into the reactor by replacing the defective fuel rods. This objective is highly desirable for economic reasons alone. The realization thereof presents difficulties, however, since the fuel elements are highly radioactive objects which can be manipulated by remote control only behind thick shielding walls. Furthermore, the length of the individual fuel rods (about 4 m) presents difficulties particularly during the insertion thereof into a vacated fuel-rod position of a fuel element, since there is danger of bending or buckling due to the small diameter of the fuel rods, which is in the order of magnitude of 1 cm. There is no danger of such an occurrence in the fabrication of new fuel elements, since the fuel rods can be pulled into the skeleton of the fuel element. In addition, consideration should be given, with respect to this problem, to the fact that each of the fuel elements is formed of a very large number of fuel rods, usually more than 200 thereof, so that it is necessary to remove only those fuel rods from the fuel-element assembly which have been recognized with certainty as being defective.

The problem therefore arose of finding a method of repairing a partly burnt-off fuel element which requires a minimum of time and requires devices that can be manipulated from outside the reactor pit, the water content of which serves as sheilding.

It is accordingly an object of the invention to provide such a method which meets the foregoing requirements, as well as a device for removing and replacing fuel rods which aids in the performance of the method.

With the foregoing and other objects in view, there is provided, in accordance with the invention, a method of repairing partly burnt-off fuel elements in a fuel-element pit of a pressurized-water reactor which comprises placing a fuel element previously detected by conventional testing methods as being defective into a holding cage in substantially upright position with the aid of remotely controlled tools, and tipping it over through 180°; removing the then upwardly disposed fuel-element foot from the fuel element so as to expose the ends of the fuel rods received in the fuel element; inspecting the fuel rods, the ends of which are then freely accessible for defects; removing with a fuel-rod exchanging tool those fuel rods at least which are determined to be defective and depositing them in a storage container; and raising replacement rods with the fuel-rod exchanging tool and inserting them into the fuel element without bending stress in exchange for the removed fuel rods.

To better understand this method, it should be recalled that a pressurized-water fuel element is formed, generally of a fuel-element skeleton which is constructed of a head and base or foot member and connecting control rod guide tubes and which, in addition, holds spacer grids for mutually spacing the fuel rods from one another in respective nominal positions thereof. The individual fuel rods, which are pulled or withdrawn through the mesh of the spacer grids, are neither fastened to the head plate nor to the base or foot plate and can therefore expand freely in axial direction. The control rod guide tubes are releasably connected to the lower base or foot plate by means of threaded bolts or pins, so that it is relatively easy to remove this base or foot plate, as compared to the removal of the head member, by means of remotely controlled tools. All the fuel rods are also, thereby, freely accessible and can be pulled out of the fuel element one after the other. Because of the relatively great length thereof, however, it is not readily possible to push the fuel rods into the fuel element, as mentioned hereinbefore. In accordance with another mode of the method of the invention, the fuel rods are inspected for penetration of water into the same.

In accordance with a further mode of the method of the invention, the removed fuel rods are replaced by new fuel rods.

In accordance with an added mode of the method of the invention, the method includes passing the fuel rods, during the removal thereof from the fuel element, through a tube traversed by a flow of water, and feeding the flow of water through a gas separator to a purification system.

In accordance with an additional mode of the method of the invention, the method includes inspecting the fuel rods during removal thereof from the fuel element by detecting the physical location of defects therein.

In accordance with yet another mode of the method of the invention, the method includes inspecting the replacement rods during the insertion thereof into the fuel element for detecting the physical location of defects therein.

In accordance with the device of the invention for removing fuel rods in the performance of the method of the invention, there are provided a pulling linkage, lockable gripper means carried by the pulling linkage and being grippingly engageable with a fuel rod for pulling the fuel rod into a guide tube, a fixed support tube located at an end of the guide tube, guide means for sealingly guiding the pulling linkage through the guide tube and into the support tube; and means connectible to the interior for sucking water out of the interior of the guide tube.

In accordance with another feature of the invention the pulling linkage has an end remote from the gripper means, and a rack-and-pinion drive is provided for moving said pulling linkage, as well as locking means for locking and unlocking the gripper means, and actuating and indicating means for the locking means located at said remote end of said pulling linkage.

In accordance with a further feature of the device of the invention, the pulling linkage is a pulling tube, and the locking means comprise a locking rod disposed in the pulling tube.

In accordance with an additional feature of the device of the invention, the fuel-element pit is filled with water, and float means are provided for weight-relieving the device.

In accordance with a concomitant feature of the device of the invention, the fuel-element pit is filled with water and the device is insertable into the water in the fuel-element pit, and float means are provided for supporting and weight-relieving the device upon insertion thereof into the water in the fuel-element pit.

Other features which are considered as characteristic for the invention are set forth in the appended claims.

Although the invention is illustrated and described herein as embodied in a method of repairing partly burnt-off fuel elements in the fuel-element pit of pressurized water reactors and device therefor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
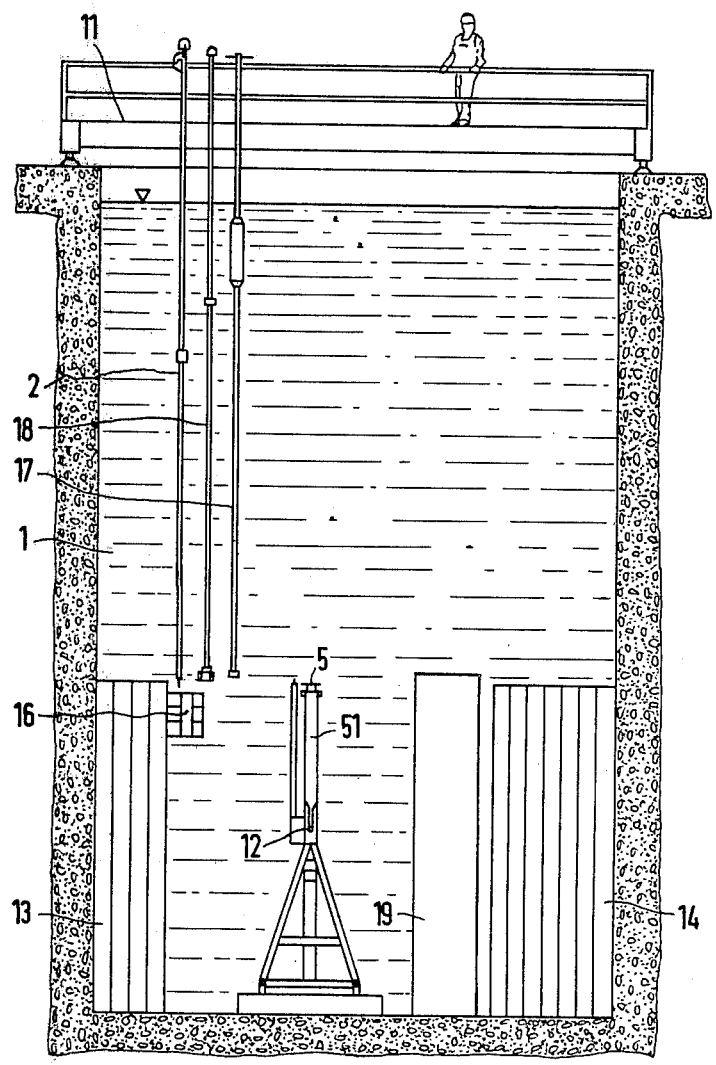
FIGS. 1 and 2 are diagrammatic cross-sectional view, taken perpendicular to one another, of a fuel element pit, including various devices and fixtures of an apparatus for performing the method of repairing partly burnt-off fuel elements in the pit, in accordance with the invention.
Figure 2:
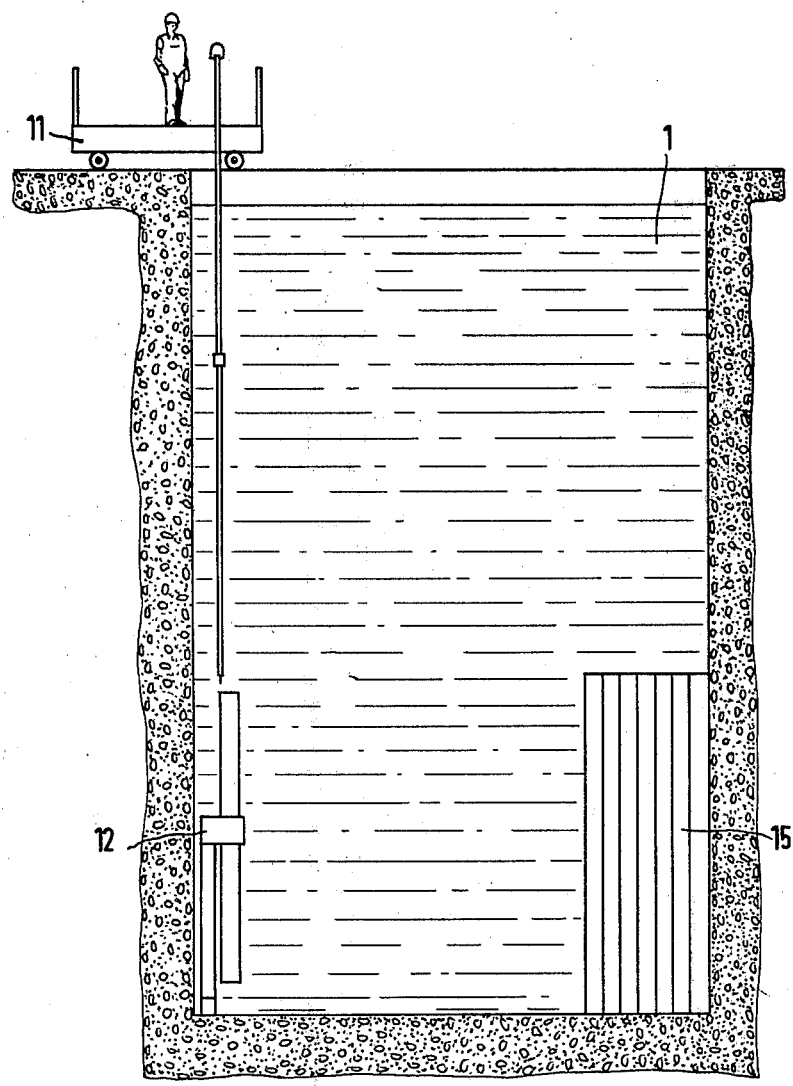

Referring now to the drawing and first, particularly, to FIGS. 1 and 2 thereof, there are shown two cross-sectional views of a fuel element pit 1, mutually disposed at an angle of 90° relative to one another. The work to be performed therein is able to be effected from a movable operating bridge 11 under visual observation. In these diagrammatic illustrations of FIGS. 1 and 2, only those tools and fixtures are shown diagrammatically as are required for performing the method of the invention. Thus, there are located at one side wall of the pit 1, a tilting device 12 for a fuel element receiving basket or cage 51, and also a storage container 13 for defective fuel rods, a supply storage 14 for new fuel rods as well as a so-called Sipping test device 19 for checking entire fuel elements for defective fuel rods that might be contained therein. A container 16 for disassembled fuel-element base or foot members, a fuel-rod exchanging tool 2 as well as a tool 18 for loosening the fuel-element foot members and a tool 17 for checking each individual fuel rod for possible damage are additionally provided.

Figure 3:
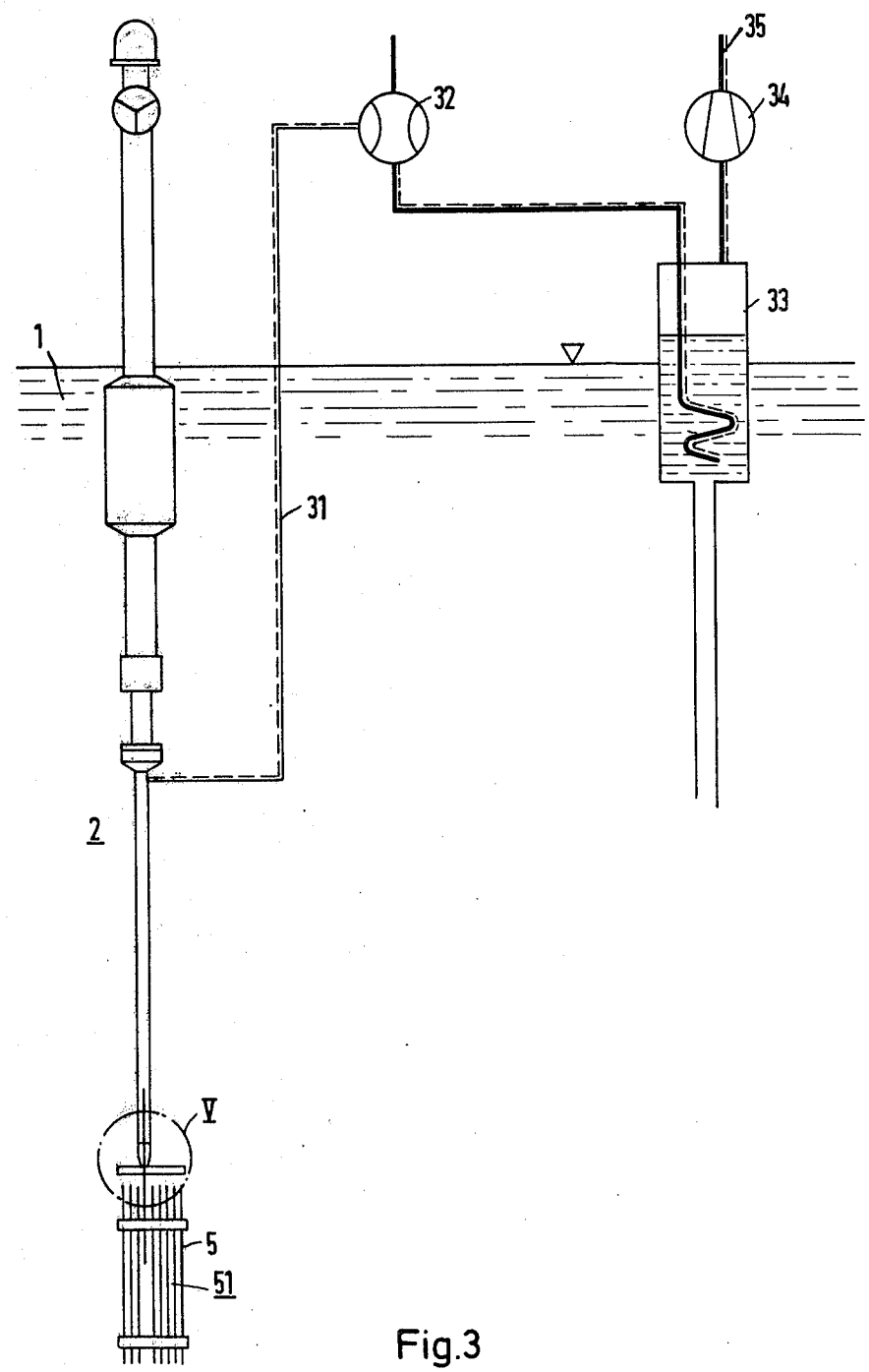
FIG. 3 is a schematic view of the apparatus showing the functional relationship between a fuel rod exchanging device and safety devices for collecting fission gases that might have escaped.
Figure 4:
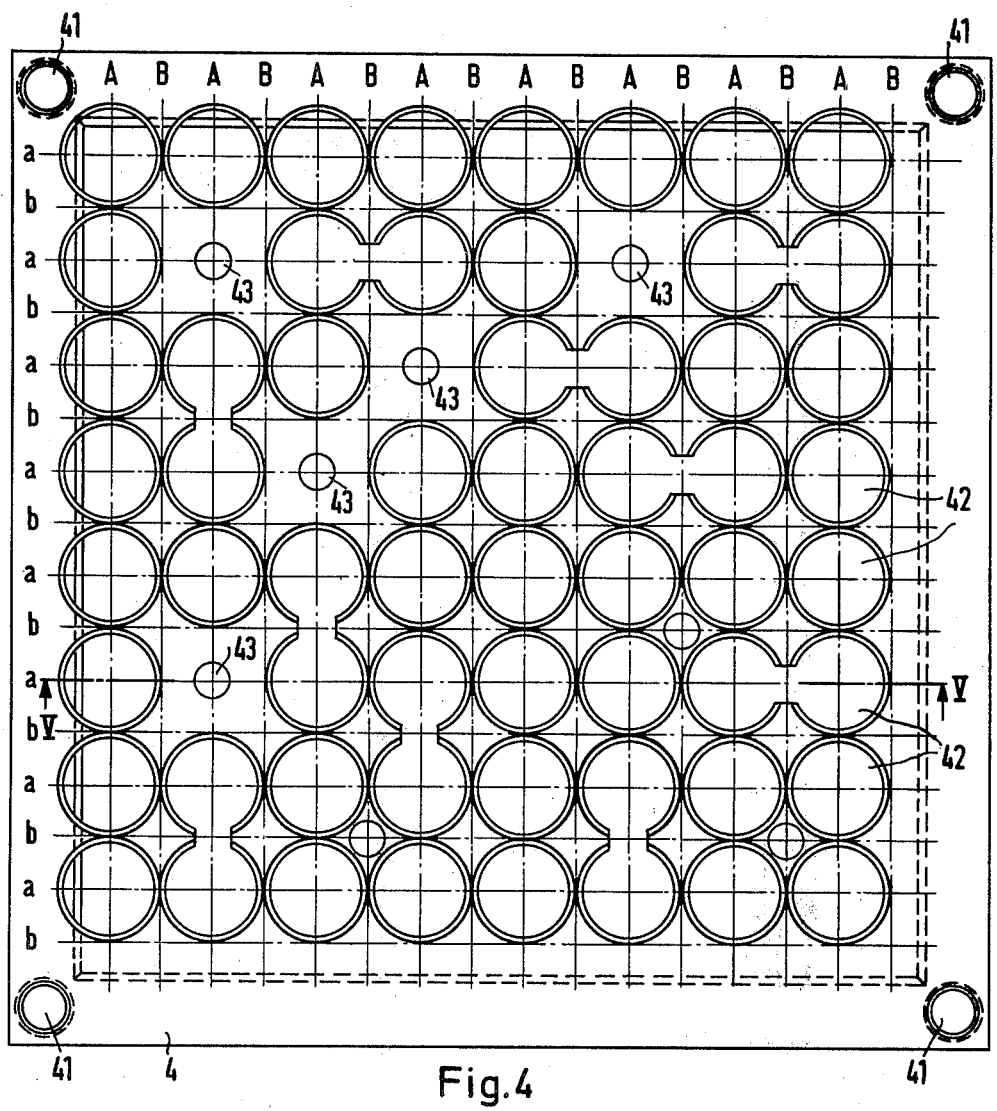
FIG. 4 is a top plan view of a centering plate required for reliable operation of the fuel rod exchanging device.

The operating sequence for the method of the invention is as follows: Each fuel element taken from the reactor core is initially introduced into the Sipping test device 19 and is examined there for possible damage to individual fuel rods. Should a fuel element 5 received therein be perceived to be defective, that fuel element 5 is placed in the receiving basket 51 of the tilting device 12. This receiving basket 5 is closable at both ends thereof. The fuel element 5, with this receiving basket 51, is then turned through 180°, so that the foot or base end of the fuel element 5 points upwardly. After the receiving basket 51 is opened at an end thereof, the base or foot member of the fuel element 5 is disassembled therefrom by means of the remotely activated tool 18 and is deposited in the storage container 16. The ends of the fuel rods in the fuel element 5, which are now freely accessible at the top of the latter, as viewed in FIG. 1, for example, are individually examined by means of the device 17, which is operatable, ultrasonically (German Published Non-Prosecuted Application DT-OS No. 2 414 650.1), for example, to detect any water leakage into the fuel rods. In this manner, the defective fuel rods are determined and can be removed from the fuel element 5. To this end, the centering plate 4, shown in top plan view in FIG. 4, is initially disposed above the fuel elements 5, the bore holes 42 of the centering plate 4 permitting accurate travel of the fuel-rod exchanging tool 2 to the respective fuel rods located underneath. This situation is schematically represented in FIG. 3. The fuel rod 52 perceived to be defective is withdrawn into the interior of the tool 2, through which water flows continuously during this operation, being drawn into the lower end of the tool 2 through a line 31 under the action of a pump 32. This measure provides the advantage that, in the case of fuel rods with cladding-tube damage that is so extensive that fission gases can escape, the escaping gases can be entrained by this flow of water upwardly within the tool 2, and the thus entrained gases can then be separated from the water in the gas separator 33 and fed to the purification and waste-gas collecting system 35. Thereafter, the defective fuel rod which is gripped and enclosed by the tool 2 is moved away by and with the latter and deposited in the container 13 for defective fuel rods. For this purpose, the pulling or drawing mechanism inside the tool 2, which may be of the rack-and-pinion type, for example, is switched over so that it then pushes the rod into the container 13, which is advantageously connected to a circulatory loop of water all its own, since it must be expected that the fuel rods stored therein give off radioactive fission gases and fission products.

Then, a new fuel rod or another replacement rod can be taken from the store 14 of new fuel rods; in principle, this corresponds to the operation of removing the fuel rod from the fuel element. Thereafter, this new fuel rod is introduced into the vacated position in the fuel element 5.

After the fuel-rod exchange operation is completed, the fuel element 5, which is now usable again, is temporarily deposited in a fuel-element storage rack 15 until it can be reinserted into the reactor core with the aid of the fuel-element loading machine.

As mentioned hereinbefore, the centering plate 4 is an essential element of the fuel-rod exchanging device 2. This plate is shown in a top plan view in FIG. 4 and in a side elevational view in FIG. 5. The intersections of the coordinates a and b with A and B, respectively, represent corresponding fuel rod positions of a fuel element or fuel assembly. From FIG. 4 and also from FIG. 5 it is clearly evident that the fuel rods 52 are disposed very closely together. For this reason, it is not possible to provide centering holes in the centering plate 4 for each individual fuel rod position so that the fuel-rod exchanging tool 2 may be applied to the respective fuel rod. This difficulty is circumvented accordingly by providing that the centering holes 42 be assigned only to each fuel rod which corresponds to the coordinate intersections a, A. In order that all of the fuel-rod positions may be reached, this centering plate 4 is raised, turned through 90° and replaced; then, the centering holes 42 correspond to fuel rod positions of the coordinate intersections a, B. A repeated similar shift through 90° permits all of those fuel rods which are located at the coordinate intersections b, B to be covered and after turning once again through 90°, those fuel rods at the coordinate intersections b, A. The illustrted bores 43 are provided for receiving the threaded bolts or pins of the control rod guide tubes 53 and, likewise, illustrated connecting breakthroughs are provided between pairs of adjacent centering holes. The latter measure is necessary so that the threaded bolts or pins of the control rod guide tubes 53 are not in the way when the centering plate 4 is put in place after having been turnably shifted through 90°.

The position of the centering plate 4 per se must depend upon the fuel element or the receiving basket or cage 51 therefor. For this purpose, the centering plate 4 is provided with four spacer posts or pins 41 which carry the centering frame 44 proper that surrounds the wall of the receiving basket or cage 51. In this manner, assurance is provided that each centering hole 42 of the plate 4 is associated with one fuel-rod end in accordance with the coordinate scheme shown and described herein.

Figure 5:
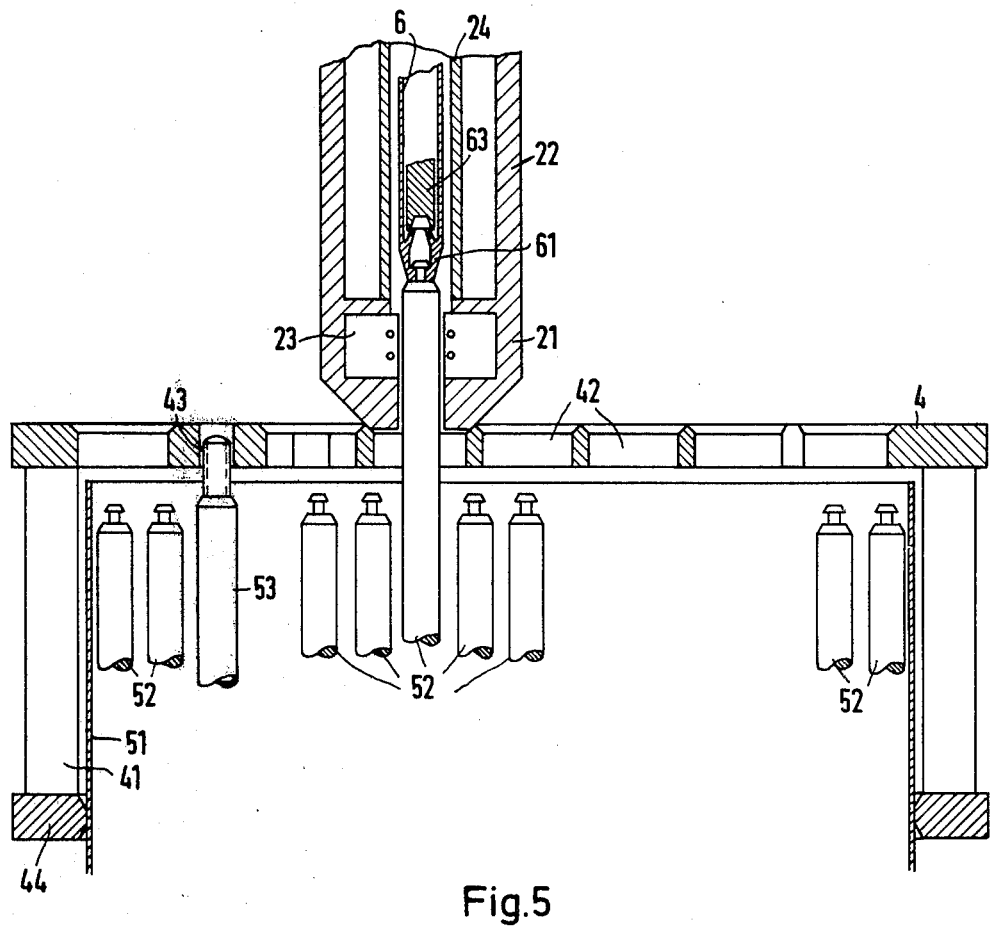
FIG. 5 is a cross-sectional view of FIG. 4 taken along the line V—V in the direction of the arrows and showing the centering plate with the fuel rod exchanging device mounted thereon.

These fuel rod ends, as shown, are provided with a mushroom-shaped head, which is surrounded by the gripper 61 as shown in FIG. 5. This gripper 61 is attached to a moving linkage 6 and thereby permits the withdrawal of the respectively gripped fuel rod 52, as shown in FIG. 5. An eddy current test probe 23 is built into the lower part 21 of this fuel rod exchanging tool 2, so that the exact location of any damage to this fuel rod 52 is immediately ascertainable as the fuel rod is being pulled through the tool 2 upon its removal from the fuel element 5.

Figure 6:
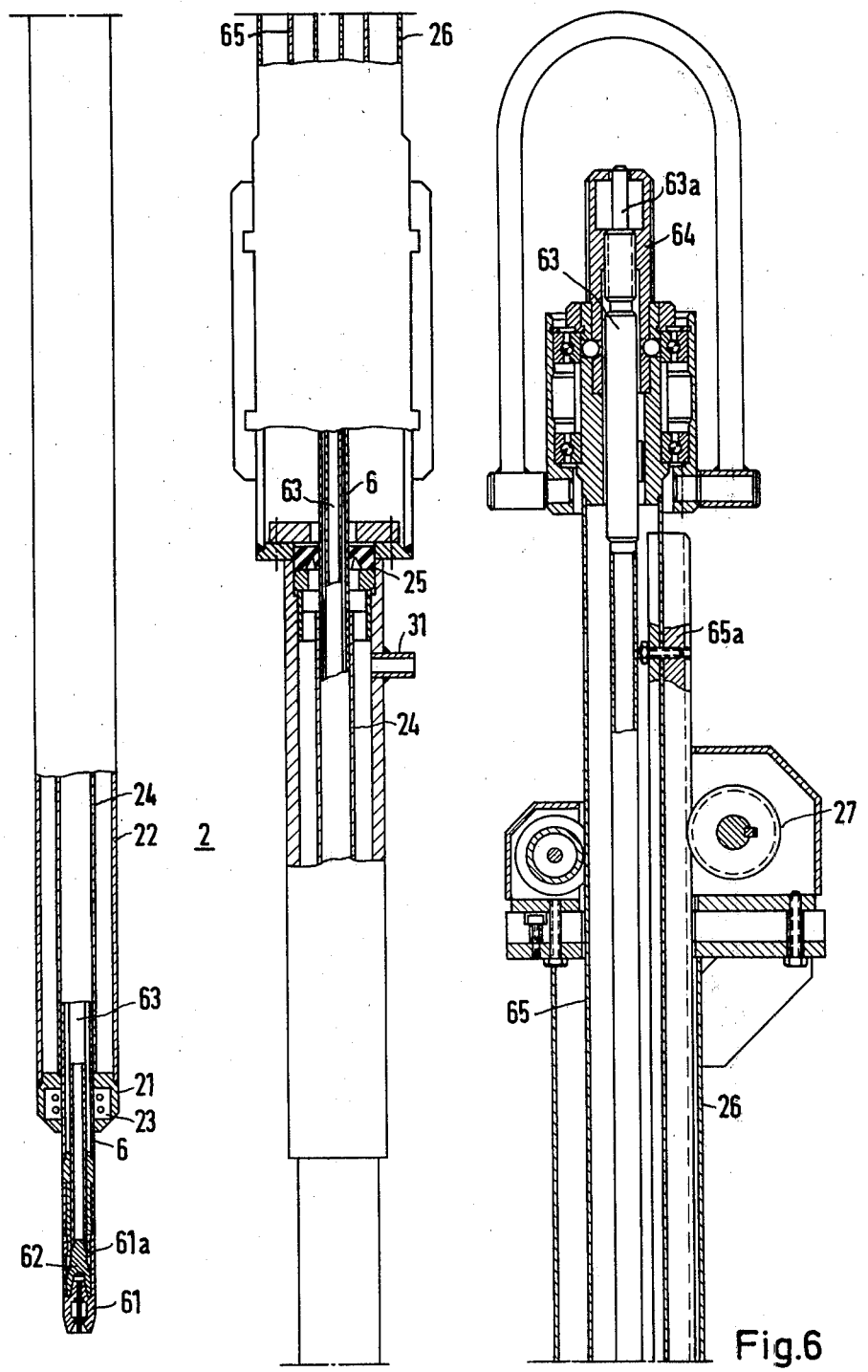
FIG. 6 is an enlarged longitudinal view, partly in section and broken into three continuous lengths, of the fuel rod exchanging device manually actuatable from outside the fuel pit.

The fuel rod exchanging tool 2 per se is diagrammatically shown in FIG. 6. On the face of it, the tool 2 is formed of a lower part which is enclosed by an outer support tube 22 and of an upper part which is surrounded by a large guide tube 26. The length of the support tube 22 is somewhat greater than the length of the fuel rod 52 to be drawn in, and the length of the large guide tube 26 is of the same order of magnitude. At the end of this large guide tube 26 there is a console or bracket carrying a driving device 27 formed, for example, of a gear drive and a hand crank. This gear drive 27 meshes with a rack 65a, which is connected to an upper withdrawal tube 65. This tube 65 is connected to the moving linkage 6 proper, which extends through the support tube 22 and into the large guide tube 26 through a seal 25. At the lower end of the support tube 22, the moving linkage 6 extends advantageously through a closure member 21 of the suport tube 22 as well as through the eddy current measuring probe 23 installed therein. On the moving linkage 6, there is located the gripper 61 proper for the respective fuel rod head; it is slotted two to three times radially and is formed of springy or resilient material. As shown, the inner contour of the gripper 61 is matched to the conventional mushroom-shaped head of the fuel-rod end cap. After being placed on this cap, the gripper 61 is clamped to the cap by a locking or coupling rod 63 in a manner that it cannot be loosened from the fuel rod head, as the locking rod 63 is pushed downwardly. The rod 63 extends through the entire tool and is provided at the upper end thereof, as shown in FIG. 6, with a thread which threadedly engages in an adjusting nut 64. This adjusting nut 64 is virtually braced against the pulling tube 65 or the end closure thereof, which is provided with a hook for connecting a lifting tool or device thereto. The end 63a of the rod 6 is provided with two markings which indicate the upper and the lower position of this rod 6 and thereby also the inwardly driven and the outwardly driven conditions of the gripper 61. In the inwardly driven condition, the gripper 61 is closed and is locked against opening. In the outwardly driven condition, and upper conical member 62 at the locking or coupling rod 63 opens the gripper 61 by making contact with a slotted opposing cone or countercone 61a. In this manner, the gripping tool releases the fuel rod; is retractible and proceeds to another fuel rod.

The hereinbefore described part of the fuel rod exchanging tool 2 exhibits the function thereof of pulling a fuel rod 52 out of a fuel element 5. For pushing a fuel rod 52 into a fuel element 5, however, it is necessary that the new fuel rod be kept free of any bending or buckling stress. For this purpose, an inner support tube 24 is provided, wherein the moving linkage 6 and, consequently, also the inwardly driven fuel rod 52 are guided. This guide tube 24 also ensures that, when the fuel rod 52 contained in this tool is pushed into the fuel element 5 or into the storage container 13 for the fuel rods 2, also, that no lateral movement of the relatively thin fuel rod 52 and consequent bending or buckling of the latter is possible due to the thrust or push exerted by the gripper head 61. Assurance is provided, in this manner, that a new fuel rod 52 can be reloaded without damage into a vacated fuel-rod position. Buckling or bending in the fuel element per se of the fuel rods 52 that are being inserted is prevented by the mesh of the spacers that are disposed at different levels of the fuel element.

Instead of performing the raising and lowering operations manually, a motor drive may also be used, of course, however, it would appear that manual operation is preferable so that possible disturbances during the feed of the fuel rod 52 into and out of the fuel element 5 can be felt more readily.

As already mentioned hereinbefore, the placing of the fuel rod exchanging tool 2 onto the centering plate 4 is controlled from above by visual observation. The tool 2 is suspended for this purpose from a suitably drivable lifting device.

To provide weight relief, it is advantageous to provide the tool further with a float at an upper part thereof, as shown diagrammatically in FIG. 3 in the interest of clarity. It should not be left unmentioned that this special fuel-rod exchanging tool 2 is usable also for performing other operations in the fuel-element pit, such as for examining the individual fuel rods 52, for example, by so-called gamma scanning, to determine the burnt-off condition thereof, by leading them past an appropriate measuring head.

We claim:
1. Device for exchanging fuel rods of partly burnt-off fuel element assembly in a water filled fuel-element pit of a pressurized-water reactor by removing the fuel element assembly head or foot, removing defective fuel rods and replacing them with new intact fuel rods, comprising a tubular apparatus being operable from a service side of the pit including an outer support tube having a lower end, a guide tube being concentrically disposed within said outer support tube and being spaced from said outer support tube defining a first space therebetween and a second space within said guide tube being in communication with said first space, a pulling tube being disposed in and sealed to said guide tube and having an inner diameter substantially corresponding to the diameter of the fuel rods, a lockable gripper connected to said pulling tube, a water discharge pipe being in communication with said first and second spaces, an eddy current measuring probe being disposed at said lower end of said outer support tube, a centering plate being attachable to a fuel element after removal of the head or foot thereof, said centering plate having centering bores formed therein through which said gripper is passable for reaching the fuel rods, a suction pump connected to said water discharge pipe, a gas separator connected to said suction pump, and a purification and waste gas collecting system connected to said gas separator.

2. Device for exchanging fuel rods according to claim 1, wherein said guide tube has a diameter which is larger than that of the fuel rods, said fuel rods being insertable into said guide tube leaving a small water filled space therebetween surrounding the fuel rod with water being sucked in by said pump during fuel rod exchange.

3. Device for exchanging fuel rods according to claim 1, wherein said pit is filled with water, and including float means for weight-relieving the device.

4. Device for exchanging fuel rods according to claim 2, including a rack and pinion for moving said pulling tube, a locking rod disposed within said pulling tube for coupling and decoupling said gripper, and operating and indicating means for said locking rod.

5. Device for exchanging fuel rods according to claim 1, wherein said centering bores are formed in said centering plate in such a pattern that by rotating said centering plate four times through 90° each fuel rod is accessible therethrough.

* * * * *